(12) United States Patent
Kawamura et al.

(10) Patent No.: US 8,628,901 B2
(45) Date of Patent: Jan. 14, 2014

(54) TONER FOR ELECTROSTATIC IMAGE DEVELOPMENTS

(71) Applicants: Takaki Kawamura, Tokyo (JP); Hiroyuki Konno, Tokyo (JP); Kouji Sugama, Tokyo (JP); Hiroshi Nagasawa, Tokyo (JP)

(72) Inventors: Takaki Kawamura, Tokyo (JP); Hiroyuki Konno, Tokyo (JP); Kouji Sugama, Tokyo (JP); Hiroshi Nagasawa, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/658,188

(22) Filed: Oct. 23, 2012

(65) Prior Publication Data
US 2013/0108953 A1    May 2, 2013

(30) Foreign Application Priority Data
Oct. 26, 2011    (JP) .................................. 2011-234754

(51) Int. Cl.
*G03G 9/087*    (2006.01)
(52) U.S. Cl.
USPC ................... 430/109.1; 430/109.3; 430/110.1
(58) Field of Classification Search
USPC .................................. 430/109.1, 109.3, 110.1
See application file for complete search history.

(56) References Cited

U.S. PATENT DOCUMENTS

2003/0096075 A1 *    5/2003    Dollase et al. ............... 428/40.1

FOREIGN PATENT DOCUMENTS

JP    06-075421    3/1994

OTHER PUBLICATIONS

English translation of Japanese Office Action, Official Notice of Reason for Refusal, Japanese Patent Application No. 2011-234754, dated of Delivery: Oct. 15, 2013.

* cited by examiner

*Primary Examiner* — Hoa V Le
(74) *Attorney, Agent, or Firm* — Lucas & Mercanti, LLP

(57) ABSTRACT

Disclosed is a toner for electrostatic image development that has sufficient low-temperature fixability, can provide high post-fixing separability, and can be used for stable formation of images at high speed.
The toner for electrostatic image development includes toner particles containing a binder resin. The binder resin contains as a part thereof a block copolymer having an A-B-A block copolymer structure including polymer blocks A composed of a structural unit derived from an alkyl methacrylate and a polymer block B composed of a structural unit derived from an alkyl acrylate. The glass transition point (TgA) of a homopolymer of the alkyl methacrylate forming the polymer blocks A is higher than the glass transition point (TgB) of a homopolymer of the alkyl acrylate forming the polymer block B.

18 Claims, 1 Drawing Sheet

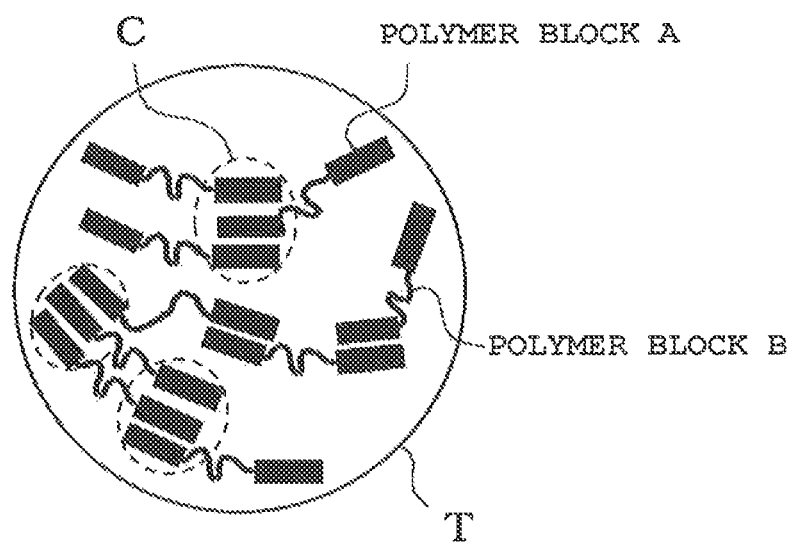

TONER FOR ELECTROSTATIC IMAGE DEVELOPMENTS

CROSS REFERENCE TO RELATED APPLICATION

This application claims the priority of Japanese Patent Application No. 2011-234754 filed Oct. 26, 2011, and is incorporated by reference herein.

TECHNICAL FIELD

The present invention relates to a toner for electrostatic image development that is used in image formation of an electrophotographic system (which hereinafter may be simply referred, to as a "toner").

BACKGROUND ART

Recently, electrophotographic image forming apparatuses used in the field of quick printing are being developed. In this situation, there is a need for image forming apparatuses having performance equivalent to that of printers conventionally used in the field of quick printing, in terms of high-speed, output, low-energy consumption, and high quality image formation. For the above purpose, efforts are being made to reduce energy consumption by, for example, reducing standby power consumption. In parallel with these efforts, it is contemplated to lower fixing temperature in a fixing step that consumes the highest amount of energy. In addition, to support high-speed printing, studies are being made to prevent an image supporting material such as a paper sheet from being wound around a fixing member, i.e., to improve post-fixing separability. Generally, to improve the post-fixing separability, it is known to introduce a thermoplastic elastomer such as a block copolymer into a binder resin making up a toner. For example, Patent Literature 1 discloses the introduction of a block copolymer having a specified storage elastic modulus. Patent Literature 2 discloses the introduction of an entropy elastic resin composed of polyisoprene and polystyrene.

To improve the low-temperature fixability of a toner, the meltability of a binder resin is improved. However, the higher the meltability, the lower the viscoelasticity of the binder resin. Such low viscoelasticity causes a reduction in separability from a fixing member in a fixing step, and a winding phenomenon occurs. Therefore, with the thermoplastic elastomers disclosed in Patent Literatures 1 and 2, the two objects, i.e., improvements in low-temperature fixability and post-fixing separability, cannot be achieved simultaneously because the toner does not have a structure having domains formed therein and therefore cannot exhibit sufficient effects. Even if the objects can be achieved, the degree of achievement is not sufficient.

CITATION LIST

Patent Literature

Patent Literature 1: Japanese Patent Application Laid-Open No. Hei. 7-271095
Patent Literature 2: Japanese Patent Application Laid-Open No. 2007-79348

SUMMARY OF INVENTION

Technical Problem

The present invention has been made in view of the foregoing circumstances and has as its object the provision of a toner for electrostatic image development that has sufficient low-temperature fixability, can provide high post-fixing separability, and can be used for stable formation of images at high speed.

Solution to Problem

To achieve at least one of the above objects, a toner for electrostatic image development reflecting one aspect of the present invention comprises toner particles containing a binder resin, wherein the binder resin, contains a block copolymer having an A-B-A block copolymer structure including polymer blocks A composed of a structural unit derived from an alkyl methacrylate and a polymer block B composed of a structural unit derived from an alkyl acrylate, and a glass transition point (TgA) of a homopolymer of the alkyl methacrylate forming the polymer blocks A is higher than a glass transition point (TgB) of a homopolymer of the alkyl acrylate forming the polymer block B.

In the above toner for electrostatic image development, a mass ratio of the polymer blocks A to the polymer block B in the block copolymer may preferably be within a range of 5/5 to 1/9.

In the above toner for electrostatic image development, the mass ratio of the polymer blocks A to the polymer block B in the block copolymer may preferably be within a range of 5/5 to 3/7.

In the above toner for electrostatic image development, a content of the block copolymer in the toner particles may preferably be 1 to 20 parts by mass per 100 parts by mass of the binder resin.

In the above toner for electrostatic image development, the content of the block copolymer in the toner particles may preferably be 5 to 10 parts by mass per 100 parts by mass of the binder resin.

In the above toner for electrostatic image development, a weight-average molecular weight (Mw) of the block copolymer may preferably be 20,000 to 160,000.

In the above toner for electrostatic image development, the weight-average molecular weight (Mw) of the block copolymer may preferably be 60,000 to 80,000.

In the above toner for electrostatic image development, the alkyl methacrylate forming the polymer blocks A may preferably nave an alkyl chain having not more than 4 carbon atoms.

In the above toner for electrostatic image development, the alkyl acrylate forming the polymer block B may preferably have an alkyl chain having not more than 8 carbon atoms.

In the above toner for electrostatic image development, the alkyl acrylate forming the polymer block B may preferably have an alkyl chain having 2 to 7 carbon atoms.

In the above toner for electrostatic image development, the alkyl acrylate forming the polymer block B may preferably have an alkyl chain having 4 carbon atoms.

In the above toner for electrostatic image development, a difference between the glass transition point (TgA) of the homopolymer of the alkyl methacrylate forming the polymer blocks A and the glass transition point (TgB) of the homopolymer of the alkyl acrylate forming the polymer block B may preferably be 10° C. or larger.

In the above toner for electrostatic image development, the difference between the glass transition point (TgA) of the homopolymer of the alkyl methacrylate forming the polymer blocks A and the glass transition point (TgB) of the homopolymer of the alkyl acrylate forming the polymer block E may preferably be 100° C. to 180° C.

In the above toner for electrostatic image development, the binder resin may preferably contain any of a styrene-acrylic resin and a polyester resin.

In the toner above for electrostatic image development, a difference between an SP value of the homopolymer of the alkyl methacrylate forming the polymer blocks A and an SP value of the homopolymer of the alkyl acrylate forming the polymer block E may preferably be 0.1 or larger.

In the above toner for electrostatic image development, the binder resin may preferably further contain a main resin other than the block copolymer, and the difference between an SP value of the homopolymer of the alkyl methacrylate forming the polymer blocks A and an SP value of the main resin may preferably be 0.1 or larger.

In the above toner for electrostatic image development, the difference between the SP value of the homopolymer of the alkyl methacrylate forming the polymer blocks A and the SP value of the main resin may preferably be 0.3 to 2.

Advantageous Effects of Invention

In the above toner for electrostatic image development, the block copolymer can be present in the binder resin so as to be immiscible with the binder resin. Therefore, sufficient low-temperature fixability and also high post-fixing separability can be obtained, and images can thereby be formed stably at high speed.

BRIEF DESCRIPTION OF DRAWINGS

The drawing FIG. 1 is a schematic diagram illustrating a toner particle constituting the toner of the present invention.

DESCRIPTION OF EMBODIMENTS

The present invention will hereinafter be described specifically.

Toner:

The toner of the present invention comprises toner particles containing a binder resin. The binder resin contains, as a part thereof, a block copolymer having an A-B-A block copolymer structure including polymer blocks A composed of structural units derived from an alkyl methacrylate and a polymer block B composed of structural units derived from an alkyl acrylate (this block copolymer may hereinafter be referred to as a "specific block copolymer"). The glass transition point (TgA) of a homopolymer of the alkyl methacrylate forming the polymer blocks A is higher than the glass transition point (TgB) of a homopolymer of the alkyl acrylate forming the polymer block B.

Specific Block Copolymer:

The specific block copolymer making up the binder resin in the toner particles has an A-B-A block copolymer structure in which polymer blocks A and a polymer block B are bonded in series in an alternating manner.

The two polymer blocks A contained in one specific block copolymer molecule may have the same composition or different compositions, but polymer blocks A having the same composition are preferred. The two polymer blocks A may have the same weight-average molecular weight (Mw) or may have different weight-average molecular weights (Mw). It is preferable that MwA1/MwA2 is within a range of 0.2 to 1, where MwA1 and MwA2 are the weight-average molecular weights of the two polymer blocks A, provided that MwA1<MwA2.

In the specific block copolymer having the above-described A-B-A block copolymer structure, the polymer blocks A, which are hard segments having a relatively high glass transition point, aggregate to form pseudo crosslinking points C in each toner particle T, as shown in the drawing FIG. 1. A domain structure is formed in each toner particle because of the pseudo crosslinking effect by the pseudo crosslinking points C. The toner particles thereby exhibit rubber elasticity, and their hardness is maintained to a certain extent. Since the specific block copolymer includes the polymer block B, which is a soft segment having a relatively low glass transition point, the specific block copolymer may be partially compatible with a resin other than the specific block copolymer in the binder resin (such a resin is hereinafter referred to as a "main resin") without impairing the thermal properties of the main resin, so that the toner particles not only exhibit hardness due to rubber elasticity but also softness. Since the block copolymer has these two types of segments, it exhibits rubber elasticity and also exhibits flowability at high temperature. Therefore, the specific block copolymer having the A-B-A block copolymer structure can provide post-fixing separability without impairing low-temperature fixability because of the effect of the polymer blocks A and the effect of the polymer block B.

In a toner containing a block copolymer having an A-B or B-A-B block copolymer structure together with a main resin, the compatibility of the polymer block B with the main resin is high. This may not allow pseudo cross linking points of the polymer blocks A, i.e., a domain structure, to be formed, and the toner particles may not exhibit rubber elasticity. Therefore, the post-fixing separability of the toner is low.

As described above, when the toner particles contain the A-B-A type specific block copolymer copolymerized with the polymer block B, a soft segment having a relatively low glass transition point, being sandwiched between the polymer blocks A, hard segments having a relatively high glass transition point, pseudo crosslinking points by the polymer blocks A are formed in the toner particles. The pseudo crosslinking effect by the pseudo crosslinking points allows the toner particles to exhibit post-fixing separability without impairing low-temperature fixability and therefore images can be stably formed at high speed.

The polymer block A contained in the specific block copolymer is composed of a (co)polymer block of an alkyl methacrylate.

Preferably, the alkyl methacrylate used to form the polymer blocks A has an alkyl chain having not more than 4 carbon atoms. Particularly preferably, methyl methacrylate is used. The alkyl methacrylates may be used either singly or in any combination thereof.

Preferably, each of the polymer blocks A and the main resin have different compositions. The different compositions herein mean that different types of monomers are used. When a plurality of types of monomers are used, the different compositions mean that the kinds of these monomers or their copolymerization ratios are different.

The composition of the polymer blocks A in the specific block copolymer can be determined by extracting a portion having a sharp peak in a molecular weight distribution of the specific block copolymer measured, by gel permeation chromatography (GPC) and then measuring the composition of the extracted portion by NMR.

The glass transition point (TgA) of the homopolymer of the alkyl methacrylate forming the polymer blocks A is preferably 10° C. to 120° C., more preferably 90° C. to 110° C.

If the glass transition point (TgA) of the homopolymer of the alkyl methacrylate forming the polymer blocks A is excessively high, the toner may not exhibit sufficient low-temperature fixability. If the glass transition point (TgA) is excessively low, the toner may not exhibit post-fixing separability.

The glass transition point of the homopolymer of the alkyl methacrylate is a theoretical glass transition point.

The polymer block B making up the specific block copolymer is composed of a (co) polymer block of an alkyl acrylate.

As examples of the alkyl acrylate forming the polymer block B, may be mentioned ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate. An alkyl acrylate having an alkyl chain having not more than 8 carbon atoms is preferably used, and an alkyl acrylate having an alkyl chain having 2 to 8 carbon atoms is more preferably used. N-Butyl acrylate having an alkyl chain having 4 carbon atoms is particularly preferably used. These alkyl acrylates may be used either singly or in any combination thereof.

The glass transition point (TgB) of the homopolymer of the alkyl acrylate forming the polymer block B is lower than the glass transition point (TgA) of the homopolymer of the alkyl methacrylate forming the polymer blocks A. The difference between the glass transition point (TgA) of the homopolymer of the alkyl methacrylate forming the polymer blocks A and the glass transition point (TgB) of the homopolymer of the alkyl acrylate forming the polymer block B is preferably 10° C. or larger, particularly preferably 100° C. to 180° C. More specifically, the glass transition point (TgB) of the homopolymer of the alkyl acrylate forming the polymer block B is 0° C. or lower, more preferably −20° C. to −70° C.

If the glass transition point (TgB) of the homopolymer of the alkyl acrylate forming the polymer block B is excessively high, the polymer block B and the main resin may not be in a compatible state, and the pseudo crosslinking effect by the polymer blocks A may not be obtained.

The glass transition point of the homopolymer of the alkyl acrylate forming the polymer block B is a theoretical glass transition point.

The mass ratio of the polymer blocks A and the polymer block B in the specific block copolymer (the mass of the polymer blocks A contained/the mass of the polymer block B contained) is preferably in a range of 5/5 to 1/9, more preferably in a range of 5/5 to 3/7.

From the viewpoint of obtaining a sufficient fixable temperature range and sufficient fixability onto a fold, the weight-average molecular weight (Mw) of the specific block copolymer is preferably 20,000 to 160,000, more preferably 60,000 to 80,000.

When the ratio of the polymer blocks A to the polymer block B in the specific block copolymer and the weight-average molecular weight (Mw) of the specific block copolymer are within the above respective ranges, both sufficient low-temperature fixability and sufficient post-fixing separability can be achieved in a reliable manner.

If the ratio of the polymer blocks A in the specific block copolymer is excessively high, sufficient low-temperature fixability may not be obtained. If the ratio of the polymer blocks A is excessively low, a sufficient pseudo crosslinking effect may not be obtained. Therefore, sufficient post-fixing separability may not be obtained.

If the weight-average molecular weight (Mw) of the specific block copolymer is excessively large, the polymer block B and the main resin may not be maintained in a compatible state. Therefore, the pseudo crosslinking points due to the polymer blocks A cannot be discretely formed in the toner particles, and sufficient post-fixing separability may thereby not be obtained. In addition, low-temperature fixability may not be obtained. If the weight-average molecular weight (Mw) of the specific block copolymer is excessively small, the polymer blocks A and the main resin may not be maintained in a phase-separated state. Therefore, the pseudo crosslinking points of the polymer blocks A cannot be formed, and sufficient post-fixing separability may thereby not be obtained.

The weight-average molecular weight (Mw) of the specific block copolymer is measured by gel permeation chromatography (GPC). More specifically, the weight-average molecular weight is measured using an apparatus "HLC-8220" (manufactured by TOSOH Corporation) and a column "TSK-guardcolumn+TSKgel SuperHZM-M (three in series)" (manufactured by TOSOH Corporation) in the flow of tetrahydrofuran (THF) used as a carrier solvent at a flow rate of 0.2 mL/min while the temperature of the column is held at 40° C. A measurement sample (specific block copolymer) is dissolved in tetrahydrofuran at a concentration of 1 mg/mL using an ultrasonic disperser. In this case, the dissolving treatment is performed at room temperature for 5 minutes. Next, the obtained solution is treated through a membrane filter having a pore size of 0.2 μm to obtain a sample solution, and 10 μL of the sample solution together with the above-described carrier solvent is injected into the apparatus. Detection is performed using a refractive index detector (RI detector), and the molecular weight distribution of the measurement sample is computed using a calibration curve determined using mono-dispersed polystyrene standard particles. Ten different types of polystyrene were used for the determination of the calibration curve.

The SP values of the homopolymer of the alkyl methacrylate forming the polymer blocks A and the homopolymer of the alkyl acrylate forming the polymer block B in the specific block copolymer will next be described. Preferably, the difference between the SP value of the polymer blocks A and the SP value of the main resin is 0.1 or larger, and the difference between the SP value of the polymer block B and the SP value of the main resin in the specific block copolymer is 3 or smaller. More preferably, the difference between the SP value of the polymer blocks A and the SP value of the main resin is 0.3 to 2, and the difference between the SP value of the polymer block B and the SP value of the main resin in the specific block copolymer is 0 to 1.

When the difference between the SP value of the polymer blocks A and the SP value of the main resin in the specific block copolymer and the difference between the SP value of the polymer block B and the SP value of the main resin in the specific block copolymer are within the above respective ranges, the main resin and the polymer blocks A are in a phase separated state in a reliable manner, and the main resin and the polymer block B are in a compatible state in a reliable manner. Therefore, the pseudo crosslinking effect of the polymer blocks A can be reliably obtained, and both sufficient low-temperature fixability and sufficient post-fixing separability can be obtained.

The SP value is a solubility parameter value at 25° C. and is inherent in a material. The SP value is a useful measure for estimating the solubility of the material. The larger the SP value, the higher the polarity of the material. The smaller the SP value, the lower the polarity. When two materials are mixed, the smaller the difference between their SP values, the higher their miscibility.

The SP value of the main resin is computed using the products of the SP values of monomers constituting the main resin and the molar ratios of the monomers. For example, assuming that the main resin is formed, from two monomers X and Y. Then the SP value of the main resin can be represented by the following formula (1):

$$SP=\{(x\times SPx/Mx)+(y\times SPy/My)\}\times\{1/(x/Mx+y/My)\} \quad \text{Formula (1)}$$

where x and y are each a mass ratio of each monomer (% by mass), Mx and My are each a molecular weight of each monomer, and SPx and SPy are each an SP value of each monomer.

The SP value of a monomer is obtained by determining the evaporation energy ($\Delta_{ei}$) and molar volume ($\Delta_{vi}$) of atoms or an atomic group in the molecular structure of the monomer by a method proposed by Fedors (Polym. Eng. Sci. Vol. 114, p 114 (1974)) and computing the SP value from, the following formula (2). However, for a double bond cleaved during polymerization, its molecular structure in the cleaved state is used.

$$\sigma=(\Sigma\Delta_{ei}/\Sigma\Delta_{vi})^{1/2} \quad \text{Formula (2)}$$

When the SP value of a monomer cannot be computed, from, the above formula (2), its specific value can be obtained by referring to Polymer Handbook, 4th edition (published by Wiley) or a solubility parameter column (http://polymer.nims.go.jp/guide/guide/p5110.html) in a database, PolyInfo, provided by National Institute for Materials Science (http://polymer.nims.go.jp).

In the toner of the present invention, the content of the specific block copolymer is preferably 1 to 20 parts by mass, particularly preferably 5 to 10 parts by mass per 100 parts by mass of the main resin.

When the content of the specific block copolymer is within the above range, high post-fixing separability can be obtained with almost no deterioration in the low-temperature fixability achieved by the main resin. However, if the content of the specific block copolymer is excessively large, sufficient low-temperature fixability may not be obtained. If the content of the specific block copolymer is excessively small, the pseudo crosslinking effect by the polymer blocks A may not be sufficiently obtained, and the post-fixing separability may not be reliably obtained.

Method of Synthesizing Specific Block Copolymer:

The specific block copolymer can be synthesized by, for example, the following method.

First, an organic lithium compound (polymerization initiator) and an organic aluminum compound are added to a solvent, and, if necessary, N,N,N',N'',N''-pentamethyldiethylenetriamine or another tertiary amine and an ether such as 1,2-dimethoxyethane or a crown ether (for example, 12-crown-4) are further added to prepare a reaction medium. Then an alkyl methacrylate used to form the polymer blocks A is added to the reaction medium, and anionic polymerization is performed until the alkyl methacrylate is no longer present as a monomer. An alkyl acrylate used to form the polymer block B is further added, and anionic polymerization is performed until the alkyl acrylate is no longer present as a monomer. Then an alkyl methacrylate used to form the polymer blocks A is further added, and anionic polymerisation is performed until the alkyl methacrylate is no longer present as a monomer. The specific block copolymer can thereby be obtained.

For example, a styrene-acrylic resin or a polyester resin is preferably used as the main resin in the binder resin. Any of olefin resins such as vinyl resins, polyamide resins, carbonate resins, polyethers, polyvinyl acetate resins, polysulfone, epoxy resins, polyurethane resins, and urea resins may also be used. These resins may be used, as the main resin, either singly or in any combination thereof.

Preferably, a resin compatible with the polymer block B in the specific block copolymer is used as the main resin, and a styrene-acrylic resin or a polyester resin is particularly preferably used.

A resin having an SP value of 8.4 to 11.5 is preferably used as the main resin.

When the main resin making up the binder resin in the toner of the present invention is a styrene-acrylic resin, specific examples of the styrene monomer used, to form the styrene-acrylic resin include styrene and styrene derivatives shown in (1) below.

(1) Styrene and styrene derivatives such as o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene.

Styrene is preferably used as the styrene monomer.

These may be used either singly or in any combination thereof.

Specific examples of the (meth)acrylic monomer used to form the styrene-acrylic resin include: methacrylic acid and methacrylate derivatives shown in (2) below; and acrylic acid and acrylate derivatives shown in (3) below.

(2) Methacrylate derivatives such as methyl methacrylate (MMA), ethyl methacrylate (EMA), n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

(3) Acrylate derivatives such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate.

As the (meth)acrylate monomer, n-butyl acrylate is preferably used.

These may be used either singly or in any combination thereof.

The styrene-acrylic resin may be a resin copolymerized using the styrene monomer, the (meth)acrylate monomer, and any of the following additional radical polymerizable monomers for copolymerization:

(1) olefins such as ethylene, propylene, and isobutylene;

(2) vinyl esters such as vinyl propionate, vinyl acetate, and vinyl benzoate;

(3) vinyl ethers such as vinyl methyl ether and vinyl ethyl ether;

(4) vinyl ketones such as vinyl methyl ketone, vinyl ethyl ketone, and vinyl hexyl ketone;

(5) N-vinyl compounds such as N-vinylcarbazole, N-vinylindole, and N-vinylpyrrolidone;

(6) vinyl compounds such as vinylnaphthalene and vinylpyridine; and (7) acrylic acid and methacrylic acid derivatives such as acrylonitrile, methacrylonitrile, and acrylamide.

Other examples of the additional radical polymerizable monomers for copolymerization include radical polymerizable monomers having an ionic leaving group other than a carboxyl group, e.g., a substituent such as a sulfonic group or a phosphate group. The ionic leaving group other than a carboxyl group is, for example, a sulfonic group or a phosphate group.

As examples of the radical polymerizable monomers having an ionic leaving group other than a carboxyl group, may be mentioned styrene sulfonic acid, allylsulfo succinic acid, 2-acrylamide-2-methylpropane sulfonic acid, acidphosphoxyethyl methacrylate, and 3-chloro-2-acidphosphoxypropyl methacrylate.

A main resin having a crosslinked structure may be formed using a polyfunctional vinyl monomer as the additional radical polymerizable monomer for copolymerization. As examples of the polyfunctional vinyl monomer, may be mentioned divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, and neopentyl glycol diacrylate.

The glass transition point of the main resin is preferably 30 to 50° C., more preferably 35 to 48° C.

When the glass transition point of the main resin is within the above range, low-temperature fixability can be reliably obtained. If the glass transition point is lower than 30° C., sufficient post-fixing separability may not be obtained. If the glass transition point is higher than 50° C., sufficient low-temperature fixability may not be obtained.

The glass transition point of the main resin is measured using a "Diamond DSC" (manufactured by PerkinElmer Co., Ltd.), As to the procedure of the measurement, 3.0 mg of the main resin is sealed in an aluminum-made pan, and the pan is placed in a holder, an empty aluminum-made pan is used as a reference. A heating-cooling-heating cycle is performed in the measurement temperature range of 0 to 200° C. while the temperature is controlled under the measurement conditions of a temperature increase rate of 10° C./min and a temperature decrease rate of 10° C./min. Analysis is performed using data in the 2nd heating, and the intersection of the extension of a base line before the rising edge of a first endothermic peak and a tangential line representing the maximum inclination between the rising edge of the first endothermic peak and the top of the peak is used as the glass transition point.

The weight-average molecular weight (Mw) of the main resin is preferably 10,000 to 30,000, more preferably 20,000 to 30,000.

When the weight-average molecular weight (Mw) is within the above range, a glass transition point within the above-described range is obtained, and the phase of the main resin and the phase of the polymer blocks A in the specific block copolymer are in a phase-separated state in a reliable manner. Therefore, both low-temperature fixability and post-fixing separability can be obtained simultaneously. However, if the weight-average molecular weight (Mw) is excessively small, sufficient post-fixing separability may not be obtained. If the weight-average molecular weight (Mw) is excessively large, sufficient low-temperature fixability may not be obtained.

The weight-average molecular weight (Mw) of the main resin is measured using the main resin as a measurement sample in the manner described above.

The toner particles of the present invention may optionally contain, in addition to the binder resin, internal additives such as a colorant, a wax, and a charge control agent.

Colorant:

Any of the commonly known dyes and pigments can be used as the colorant.

As a colorant used to obtain a black toner, any of various publicly known colorants such as carbon blacks (e.g., furnace black and channel black), magnetic substances (e.g., magnetite and ferrite), dyes, and inorganic pigments including containing nonmagnetic iron oxide may be used.

As a colorant used to obtain a color toner, any of the publicly known colorants such as dyes and organic pigments may be used. Specific examples of the organic pigments include C.I. Pigment Red: 5, 48:1, 53:1, 57:1, 81:4, 122, 139, 144, 149, 166, 177, 178, 222, 238, and 269, C.I. Pigment Yellow: 14, 17, 74, 93, 94, 138, 155, 180, and 185, C.I. Pigment Orange: 31 and 43, and C.I. Pigment Blue: 15: 3, 60, and 76. Specific examples of the dyes include C.I. Solvent Red: 1, 49, 52, 58, 68, 11, and 122, C.I. Solvent Yellow: 19, 44, 77, 79, 81, 82, 93, 98, 103, 104, 112, and 162, and C.I. Solvent Blue: 25, 36, 69, 70, 93, and 95.

The colorants for each color of various colored toners may be used either singly or in any combination thereof.

Wax:

No particular limitation is imposed on the wax. Examples of the wax include: long chain hydrocarbon-based waxes such as polyolefin waxes (polyethylene wax and polypropylene wax), paraffin wax and Sasol wax; ester-based waxes such as trimethyiolpropane tribehenate, pentaerythritol tetramyristate, pentaerythritol tetrastearate, pentaerythritol tetrabehenate, pentaerythritol diacetate dibehenate, glycerin tribehenate, 1,18-octadecanediol distearate, tristearyl trimellitate, and distearyl maleate; amide-based waxes such as ethylenediamine dibehenylamide and tristearyl trimellitate amide; dialkyl ketone-based waxes such as distearyl ketone; carnauba wax; and montan wax.

The melting point of the wax used is generally 40 to 160° C., preferably 50 to 120° C., more preferably 50 to 90° C. When a wax having a melting point within the above range is used, the toner obtained can have heat-resistant storage stability, and images can be formed stably even when low-temperature fixing is performed.

The content of the wax is preferably 1 to 30% by mass, more preferably 5 to 20% by mass based on the mass of the binder resin.

Charge Control Agent:

Any of various publicly known compounds can be used as the charge control agent.

The content of the charge control agent is generally 0.1 to 10% by mass, preferably 0.5 to 5% by mass based on the mass of the binder resin.

Average Particle Diameter of Toner:

The average particle diameter (for example, volume-based median diameter) of the toner is preferably 3 to 9 μm, more preferably 3 to 8 μm. When the toner is produced using, for example, an emulsion polymerization association so toed described later, the particle diameter can be controlled by changing the concentration of an aggregating agent used, the amount added of an organic solvent, the fusion-bonding time, and the composition of the polymer.

When the volume-based, median diameter is within the above range, transfer efficiency increases, and the quality of a halftone image is improved, resulting in sin improvement in the image quality of fine lines and dots.

The volume-based median diameter of the toner particles is measured and computed using a measuring device composed of "Multisizer 3" (manufactured by Bookman Coulter, Inc.) and a computer system connected thereto and equipped with data processing software "Software V3.51." Specifically, 0.02 g of the toner is added to 20 mL of a surfactant solution (a surfactant solution used for the purpose of dispersing the toner particles and obtained, for example, by diluting a neutral detergent containing a surfactant component ten-fold with pure water) and is left to stand, and then ultrasonic dispersion is performed for 1 minute to prepare a dispersion of the toner. This toner dispersion is added with a pipette to a beaker containing "ISOTON II" (manufactured by Beckman Coulter, Inc.) and held in a sample stand until the concentration displayed in the measuring device reaches 8%. By using the above concentration range, a reproducible measurement value can be obtained. In the measuring device, the number of particles to be counted is set to 25,000, and the diameter of an aperture is set to 50 μm. The range of measurement (1 to 30 μm) is divided into 256 sections, and a frequency value in each, section is computed. The particle size when a cumulative volume fraction cumulated from, the large-size end is 50% is used as the volume-based median diameter.

Average Circularity of Toner Particles:

From the viewpoint of improving the transfer efficiency of the toner particles constituting the toner of the present invention, the average circularity of the toner particles represented by the following formula (T) is preferably 0.930 to 1.000, more preferably 0.950 to 0.995.

Formula (T): average circularity=circumferential length determined from equivalent circle diameter of particle/circumferential length of projected image of particle The glass transition, point of the toner described above is preferably 30 to 50° C., more preferably 35 to 45° C.

The softening point of the toner is preferably 80 to 110° C., more preferably 90 to 105° C.

The glass transition point (Tg) of the toner is measured using the toner as a measurement sample by a method similar to the above-described method.

The softening point of the toner is measured as follows.

First, 1.1 g of the toner is placed in a petri dish in an environment of a temperature of 20±1° C. and a relative humidity of 50±5% RH and then is leveled, off. After left to stand for 12 hours or longer, the toner is pressurized using a press "SSP-10A" (manufactured by Shimadzu Corporation) at a pressure of 3,820 kg/cm$^2$ for 30 seconds to produce a cylindrical molded sample having a diameter of 1 cm. Then the molded sample is placed in a flow tester "CFT-500D" (manufactured by Shimadzu Corporation) in an environment of a temperature of 24±5° C. and a relative humidity of 50±20% RH. Under the conditions of a load of 196 N (20 kgf), a start temperature of 60° C., a preheating time of 300 seconds, and a temperature increase rate of 6° C./min, the molded sample is extruded from the hole (1 mm diameter×1 mm) of a cylindrical die using a piston having a diameter of 1 cm after completion of preheating. An offset method temperature $T_{offset}$ measured by a melting temperature measurement method (temperature rising method) with an offset value being set to 5 mm is regarded, as the softening temperature of the toner.

The toner described above contains the A-B-A type specific block copolymer copolymerized with the polymer block B (soft segment having a relatively low glass transition point) being sandwiched between the polymer blocks A (hard segments having a relatively high glass transition point), and pseudo crosslinking points of the polymer blocks A (hard segments) are formed in the toner particles. The pseudo crosslinking effect by the pseudo crosslinking points allows the toner particles to exhibit post-fixing separability without impairing low-temperature fixability, and therefore images can be stably formed, at high speed.

Production Process of Toner:

The toner of the present, invention can be produced by any of various publicly known processes. Representative examples of the process of producing the toner of the present invention include a so-called emulsion polymerization association method in which fine resin particles formed in a water-based medium containing a surfactant are aggregated and fusion-bonded in a water-based medium to produce toner particles. The toner produced by the emulsion polymerization association method has a highly uniform particle diameter and a highly uniform shape. Therefore, the toner can be particularly preferably used as a toner for forming digital images that often require high fine-line reproducibility and are formed of fine dots.

When the emulsion polymerization association method is adopted, it is required to prepare fine resin particles composed only of the specific block copolymer or fine resin particles containing the specific block copolymer. Examples of the method of preparing such fine resin particles include: (a) a method in which the specific block copolymer is directly emulsified in a water-based medium at high temperature using a pressure ejection homogenizer, (b) a method using a so-called dissolving suspension method in which the specific block copolymer is dissolved in a solvent and dispersed in a water-based medium to form emulsified particles (oil droplets) and then the solvent is removed, and (c) a method using so-called miniemulsion polymerization in which the specific block copolymer is dissolved in a polymerizable monomer for forming the main resin and then dispersed in a water-based medium to form emulsified particles (oil droplets) and then fine resin particles composed of the main resin and the specific block copolymer are obtained under the action of a polymerization initiator.

An exemplary specific process of producing the toner of the present invention containing a colorant using the emulsion polymerization association method comprises:

(1) a main resin polymerizing step of forming fine resin particles composed of the main resin and the specific block copolymer for forming the binder resin in a water-based medium by the miniemulsion polymerization method to prepare a dispersion containing the fine resin particles;

(2) a fine colorant particle dispersion preparing step of preparing a dispersion containing fine colorant particles dispersed in a water-based medium;

(3) an aggregating-fusion bonding step of forming associates particles by aggregating and fusion-bonding the fine resin particles composed of the main resin and the specific block copolymer and the fine colorant particles in a water-based medium;

(4) an aging step of aging the associated particles by thermal energy to control the shape of the associated particles;

(5) a washing step of separating the associated particles from the dispersion of the associated particles (the water-based medium) by filtration to remove the surfactant etc. from the associated particles; and (6) a drying step of drying the washed associated particles to obtain mother toner particles; and optionally comprises (7) an external additive adding step of adding external additives to the dried mother toner particles.

(1) Main Resin Polymerizing Step:

In the main resin polymerizing step, the miniemulsion polymerization method is adopted. More specifically, the specific block copolymer polymerized in advance is dissolved in a polymerizable monomer for forming the main resin, and the mixture is dispersed in a water-based medium by application of mechanical energy to form emulsified particles (oil droplets). Then the monomer for the main resin is polymerized under the action of a polymerization initiator, and simultaneously fine resin particles composed of the specific block copolymer and the main resin are formed. The fine resin particles are supplied to the aggregating-fusion bonding step.

When fine resin particles containing the specific block copolymer are prepared by the method (a) or (b) described above, fine resin particles of the polymerizable monomer for forming the main resin are formed by a method similar to the method described above with no specific block copolymer being introduced into the polymerizable monomer, and the fine resin particles of the specific block copolymer are separately produced. These two types of fine resin particles are simultaneously supplied to the aggregating-fusion bonding step.

In the present invention, the "water-based medium" means a medium composed of 50 to 100% by mass of water and 0 to 50% by mass of water-soluble organic solvent. Examples of the water-soluble organic solvent include methanol, ethanol, isopropanol, butanol, acetone, methyl ethyl ketone, and tetrahydrofuran. The water-soluble organic solvent is preferably an alcohol-based organic solvent that does not dissolve the resin obtained.

Dispersion Stabilizer:

Preferably, a dispersion stabilizer is added to the water-based medium, from the viewpoint of polymerizing liquid droplets in a stable state in the water-based medium and of stably aggregating and fusion-bonding the fine resin particles etc. dispersed in the water-based medium.

Examples of the dispersion stabilizer include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina. Any of the commonly used surfactants such as polyvinyl alcohol, gelatin, methylcellulose, sodium dodecylbenzene sulfonate, ethylene oxide adducts, and sodium higher alcohol sulfates can also be used as the dispersion stabilizer.

The following surfactants can also be used:

ionic surfactants such as sulfonates (for example, sodium, dodecylbenzene sulfonate, sodium arylalkylpolyether sulfonates, sodium 3,3-disulfonediphenylurea-4,4-diazo-bis-amino-8-naphthol-6-sulfonate, o-carboxybenzene-azo-dimethylaniline, and sodium 2,2,5,5-tetramethyl-triphenylmethane-4,4-diazo-bis-β-naphthol-6-sulfonate), sulfates (for example, sodium dodecylsulfate, sodium tetradecylsulfate, sodium pentadecylsulfate, and sodium octylsulfate), and fatty acid salts (for example, sodium oleate, sodium laurate, sodium caprate, sodium caprylate, sodium caproate, potassium stearate, and calcium oleate); and non-ionic surfactants such as polyethylene oxide, polypropylene oxide, a combination of polypropylene oxide and polyethylene oxide, higher fatty acid esters of polyethylene glycol, alkylphenol polyethylene oxides, higher fatty acid esters of polypropylene oxide, and sorbitan esters.

The above dispersion stabilizers and/or the surfactants may be used either singly or in any combination thereof, if necessary.

Polymerization Initiator:

Any of various publicly known oil-soluble polymerization initiators and water-soluble polymerization initiators can be used as the polymerization initiator used in the main resin polymerizing step. Specific examples of the oil-soluble polymerization initiators include the following azo-based polymerization initiators, diazo-based polymerization initiators and peroxide-based, polymerization initiators:

(1) azo-based and diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and (2) peroxide-based polymerization initiators such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy) triazine.

When the fine resin particles are formed by the emulsion polymerization association, method, a water-soluble polymerization initiator can be used. Specific examples of the water-soluble polymerization initiator include: persulfates such as potassium persulfate and ammonium persulfate; azobisaminodipropane acetate; azobiscyanovaleric acid and salts thereof; and hydrogen peroxide.

Chain Transfer Agent:

In the main resin polymerizing step, any commonly used chain transfer agent can be used for the purpose of controlling the molecular weight of the main resin. No particular limitation is imposed on the chain transfer agent, and examples thereof include octyl mercaptan, dodecyl mercaptan, tert-dodecyl mercaptan, n-octyl-3-mercapto propionate, terpinolene, carbon tetrabromide, and an α-methylstyrene dimer.

The dispersion diameter (volume-based median diameter) of the fine resin particles dispersed in the water-based medium is preferably 10 to 70 nm, more preferably 30 to 70 nm.

The volume-based median diameter of the fine resin particles in the water-based medium is measured using "Microtrac UPA-150" (manufactured by NIKKISO Co., Ltd.).

More specifically, a few drops of the fine resin particles for measurement are added to a 50 mL graduated cylinder, and then 25 mL of pure water is added thereto. The fine resin particles are subjected to dispersion treatment for 3 minutes using an ultrasonic cleaner "US-1" (manufactured, by AS ONE Corporation) to produce a measurement sample. Then 3 mL of the measurement sample is placed in a cell of "Microtrac UPA-150" (manufactured by NIKKISO Co., Ltd.), After the value of "Sample-Loading" is confirmed, to be in the range of 0.1 to 100, the measurement is performed under the following measurement and solvent conditions.

—Measurement Conditions—
Transparency: Yes
Refractive Index: 1.59
Particle Density; 1.05 g/cm$^3$
Spherical Particles: Yes
—Solvent Conditions—
Refractive Index: 1.33
Viscosity
High (temp): $0.797 \times 10^{-3}$ Pa·s
Low (temp): $1.002 \times 10^{-3}$ Pa·s When the toner particles according to the present invention contain internal additives such as a wax and a charge control agent in addition to the binder resin and the colorant, the internal additives can be introduced, into the toner particles by, for example, dissolving or dispersing the internal additives in the polymerizable monomer for forming the main resin in advance in the main resin polymerizing step.

These internal additives can also be introduced into the toner particles by separately preparing a fine internal additive particle dispersion composed only of the internal additives and then aggregating the fine internal additive particles together with the fine resin particles and the fine colorant particles in the aggregating-fusion bonding step (3).

(2) Fine Colorant Particle Dispersion Preparing Step:

The fine colorant particle dispersion can be prepared by dispersing a colorant including carbon black in a water-based medium. The treatment for dispersing the colorant is performed with the concentration of a surfactant in a water-based medium being equal to or higher than a critical micelle concentration (CMC). No particular limitation is imposed on a disperser used for the treatment for dispersing the colorant. Preferred examples of the disperser include an ultrasonic disperser, a mechanical homogenizer, pressurizing dispensers such as a Manton-Gaulin homogenizer and a pressure-type homogenizer, and medium-type dispersers such as a sand grinder, a Getzmann mill, and a diamond fine mill.

Examples of the surfactant used include the surfactants described above.

The dispersion diameter (volume-based median diameter) of the fine colorant particles in the fine colorant particle dispersion prepared in the fine colorant particle dispersion preparing step is 10 to 300 nm, more preferably 10 to 200 nm. When fine colorant particles having such a dispersion diameter are prepared, the colorant in the obtained toner can have an appropriate dispersion diameter.

The volume-based median diameter of the fine colorant particles in the fine colorant particle dispersion is measured using an electrophoretic light-scattering photometer "ELS-800" (manufactured by Otsaka Electronics Co., Ltd.), (3) Aggregating-Fusion Bonding Step:

Preferably, a salting-out/fusion-bonding method is used as a specific method of aggregating and fusion-bonding the fine resin particles and the tine colorant particles in the aggregating-fusion bonding step. If necessary, fine particles of internal additives such as fine wax particles and charge control agent particles may be aggregated and fusion-bonded together with the fine resin particles and the fine colorant particles in the aggregating-fusion bonding step.

The "salting-out/fusion-bonding method" is as follows. A salting agent, used, as an aggregating agent is added to a water-based medium at a concentration equal to or higher than a critical, aggregation concentration. Then the mixture is heated at a temperature equal to or higher than the glass transition point of the fine resin particles of the main resin and the melting peak temperature (° C.) of the mixture to allow salting-out of fine particles such as the fine resin particles and the fine colorant particles to proceed and simultaneously fusion-bonding of these particles to proceed. After the diameter of these growing particles reaches a desired value, an aggregation stopper is added to stop the particle growth. Then, if necessary, heating is continued to control the shape of the particles.

Aggregating Agent:

Examples of the aggregating agent include salts of alkali metals and salts of alkaline-earth metals. Examples of the alkali metal constituting the aggregating agent include lithium, potassium, and sodium, and examples of the alkaline-earth metal constituting the aggregating agent include magnesium, calcium, strontium, and barium. Of these, potassium, sodium, magnesium, calcium, and barium are preferred. Examples of the counter ion (negative ion forming the salt) of the alkali metal or the alkaline-earth metal include a chloride ion, a bromide ion, an iodide ion, a carbonate ion, and a sulfate ion.

(4) Aging Step:

By controlling the heating temperature in the aggregating-fusion bonding step described above, the shape of the toner particles in the toner can be uniformized to some extent. However, the aging step is performed to further uniformize the shape.

In the aging step, heating temperature and time are controlled such that the formed, associated particles have a narrow particle size distribution and further have smooth surfaces and a uniform shape. More specifically, in the aggregating-fusion bonding step, the heating temperature is set to be relatively low to suppress the progress of fusion bonding of the fine resin particles and facilitate uniformization. Also in the aging step, the heating temperature is controlled to be relatively low, and the heating time is set to be long to allow the associated particles to have desired average circularity, i.e., to have a uniform surface shape.

(5) Washing Step:

In the washing step, first, the dispersion of the associated particles is subjected to cooling treatment (quenching treatment). The cooling treatment is performed at a cooling rate of, for example, 1 to 20° C./min. No particular limitation is imposed, on a specific method in the cooling treatment, and examples include publicly known methods such as a cooling method in which a coolant is introduced from the outside of a reaction vessel and a cooling method in which cold water is directly added to a reaction system.

Next, the associated particle dispersion subjected to the cooling treatment is subjected to solid-liquid, separation, and the separated associated particles are washed. More specifically, solid-liquid separation treatment in which the associated particles are separated from the associated particle dispersion cooled to a prescribed temperature by the cooling treatment is performed. Then adhering materials such as the surfactant, the salting agent, etc. are removed, from the toner cake of the associated particles (cake-like wet aggregates of the associated particles) formed by solid-liquid separation. Representative examples of the solid-liquid separation treatment include filtration treatment. Specific examples of the filtration treatment include centrifugal separation, filtration under reduced pressure using a suction funnel and filtration using a filter press etc.

(6) Drying Step:

In the drying step, the washed toner cake is pulverized and dried to obtain dried associated particles, i.e., mother toner particles. Examples of the dryer usable in this step include: publicly known drying treatment apparatuses such as a spray dryer, a vacuum freeze dryer, and a vacuum dryer; a stationary shelf dryer; a movable shelf dryer; a fluidized-bed dryer; a rotary dryer; and a stirring dryer. The content of water in the dried associated particles is preferably 5% by mass or lower, more preferably 2% by mass or lower.

When the dried associated particles are aggregated through weak attractive force therebetween to form aggregates, the aggregates may be pulverized. Examples of the pulverizer include mechanical pulverizers such as a jet mill, a Henschel mixer, a coffee mill, and a food, processor.

(7) External Additive Adding Step:

In the external additive adding step, external additives are optionally added to the dried mother toner particles and mixed to prepare toner particles.

The mother toner particles produced through the drying step and the preceding steps can be used as toner particles without any other treatment. However, preferably, external additives such as publicly known particles (for example, inorganic fine particles and organic fine particles) and a lubricant are added to the surface of the mother toner particles, from the viewpoint of improving the charging ability, flowability, or cleanability of the toner.

Preferred examples of the inorganic particles include inorganic fine particles of silica, titania, alumina, and strontium, titanate.

These inorganic fine particles may be subjected to hydrophobic treatment, if necessary.

As she organic fine particles, spherical organic fine particles having a number average primary particle diameter of about 10 to about 2,000 nm can be used. More specifically, organic fine particles of a homopolymer of styrene or methyl methacrylate or a copolymer thereof can be used.

The lubricant is used for the purpose of further improving the cleanability and transfer properties. Examples of the lubricant include metal salts of higher fatty acids such as stearates of zinc, aluminum, copper, magnesium, calcium, etc., oleates of zinc, manganese, iron, copper, magnesium, etc., palmitates of zinc, copper, magnesium, calcium, etc., linoleates of zinc, calcium, etc., and ricinoleates of zinc, calcium, etc.

A combination of various materials may be used as an external additive.

The total amount of the external additives added to the toner is preferably 0.1 to 10.0% by mass.

Examples of a method of adding the external additives include an adding method using any of the publicly known, mixers such as a turbular mixer, a Henschel mixer, a nauta mixer, and a V-type mixer.

Developer:

The toner of the present invention can be used as a magnetic or non-magnetic one-component developer or may be mixed with a carrier and used as a two-component developer.

When the toner is used as a two-component developer, the amount of the toner mixed with the carrier is preferably 2 to 10% by mass.

No particular limitation is imposed on a mixer used to mix the toner and the carrier, and examples of the mixer include a nauta mixer and W-cone and V-type mixers.

Preferably, a ferrite carrier having a volume-based median diameter of 10 to 60 μm and a saturation magnetization value of 20 to 80 emu/g is used as the carrier. The use of such a carrier having a small particle diameter and a small saturation magnetization value allows forming of a soft magnetic brush on a developing sleeve, and images of high sharpness can thereby be formed.

A representative example of a device used to measure the volume-cased median diameter of the carrier is a laser diffraction-type particle size distribution measuring device "HELOS" (manufactured by SYMPATEC) equipped with a wet-type disperser.

The saturation magnetization value of the carrier is measured using a "DC magnetization characteristic automatic recorder 3251-35" (manufactured by Yokogawa Electric Corporation).

Preferably, a coated carrier obtained by coating the surface of magnetic particles (cores) with a resin is used as the carrier. No particular limitation is imposed on the resin used to coat the cores, and any of various resins can be used. For example, any of fluorocarbon resins, fluorine-acrylic acid resins, silicone resins, modified silicone resins, etc. can be used for a toner formed for positive electrification, and a condensed-type silicone resin is particularly preferably used. Any of styrene-acrylic resins, a resin mixture of a styrene-acrylic resin and a melamine resin and a cured, product thereof, silicone resins, modified silicone resins, epoxy resins, polyester resins, urethane resins, polyethylene resins, etc. can be used, for a toner formed for negative electrification. Of these, a resin mixture of a styrene-acrylic resin and a melamine resin, a cured product thereof, and a condensed-type silicone resin are preferably used.

When the toner of the present invention is used as a two-component developer, a charge control agent, an adhesion promoter, a primer treatment agent, a resistance controlling agent, etc. may be optionally added to the toner and the carrier to form, the two-component developer.

Image Forming Method:

The toner of the present invention can be used in commonly used image forming methods of an electrophotographic system.

The embodiments of the present invention have been specifically described. However, the embodiments of the present invention are not limited to the examples described above, and various modifications can be made thereto.

EXAMPLES

Specific Examples of the present invention will next be described, but the invention is not limited thereto.

Block Copolymer Production Example 1

A three way cock was attached to a 1 L three-neck flask, and the inside of the flask was degassed and replaced with nitrogen. Then, at room temperature, the flask was charged with 390 g of toluene, 0.94 mL of N,N,N',N'',N''-pentamethyldiethylenetriamine, and 18 mL of a toluene solution containing 11 mmol of isobutylbis (2,6-di-t-butyl-4-methylphenoxy)aluminum and then charged with 0.8 mL of a solution mixture of n-hexane and cyclohexane containing 1.0 mmol of sec-butyl lithium. Then 35 g of monomer A1 (methyl methacrylate (MMA)) was added to the mixture. The resultant mixture was stirred at room temperature (25° C.) for 1 hour, and then the internal temperature of the monomer solution was decreased to −12° C., Seventy grams of monomer B (n-butyl acrylate (BA)) was added dropwise to the monomer solution over 6 hours. Then 35 g of monomer A2 (methyl methacrylate) was farther added to the reaction mixture, and the resultant mixture was allowed to react at room temperature under stirring. The reaction was performed, at room temperature for 10 hours under stirring, and then 1 g of methanol was added to terminate the polymerization. After the termination of the polymerization, the reaction mixture was poured, into a large amount of a solution mixture of methanol and water (the ratio of the amount of methanol was 90% by mass) to allow a block copolymer [1] to precipitate. The block copolymer [1] was thereby obtained.

In the obtained block copolymer [1], a polymer block ratio was 5/5, and the weight-average molecular weight (Mw) of the block copolymer [1] was 80,000. Here, the polymer block ratio is defined as (the mass of a polymer block composed of structural units derived from the monomer A1+the mass of a polymer block composed of structural units derived from the monomer A2)/(the mass of a polymer block composed of structural units derived from the monomer B).

TABLE 1 shows (MwA1/MwA2) (the weight-average molecular weight of the polymer block composed of the structural units derived from the monomer A1/the weight-average molecular weight of the polymer block composed of the structural units derived from the monomer A2), the glass transition point (TgA) of a homopolymer of the MMA, the glass transition point (TgB) of a homopolymer of the BA, the SP value (SP(A)) of the polymer blocks composed of the structural units derived from the MMA, and the SF value (SP(B)) of the polymer block composed of the structural units derived from the BA.

Block Copolymer Production Examples 2 to 9

Block copolymers [2] to [9] were obtained as in Block Copolymer Production Example 1 except that monomers shown in TABLE 1 were used as the monomers A1 and A2 and the monomer B. More specifically, equal amounts of the monomers A1 and A2 were used, and the total mass of the monomers A1, A2 and B was the same as that in Block Copolymer Production Example 1. In addition, the mass ratio A/B shown in TABLE 1 was satisfied.

Block Copolymer Production Example 10

A three way cock was attached, to a 1 L three-neck flask, and the inside of the flask was degassed and replaced with nitrogen. At room temperature, the flask was charged with 500 g of degassed cyclohexane and 15 g of styrene. Then 75 g of tetrahydrofuran and 0.4 g of n-butyl lithium were added to the mixture, and adiabatic polymerization was started from 50° C. After completion of the reaction, the temperature of the reaction mixture was adjusted to 30° C. Then 70 g of n-butyl acrylate was added to the mixture, and adiabatic polymerization was performed. After completion of the reaction, 15 g of styrene was further added, and adiabatic polymerization was performed. After completion of the polymerization, the obtained polymerization reaction mixture was poured into methanol, and the precipitated solids were separated by filtration and dried at 50° C. for 20 hours to obtain a block copolymer [10].

Polymer Production Example 11

A copolymer [11] was obtained as in Block Copolymer Production Example 1 except that the monomer E was not used.

TABLE 1 shows the polymer block ratio of each of the obtained block copolymers, the weight-average molecular weight(Mw), (MwA1/MwA2) (the weight-average molecular weight of the polymer block composed of the structural units derived from the monomer A1/the weight-average molecular weight of the polymer block composed of the structural units derived from the monomer A2), the glass transition point (TgA) of a homopolymer of the monomer A1, the glass transition point (TgB) of a homopolymer of the monomer B, the SP value (SP(A)) of the polymer block composed of the structural units derived from the monomer A1, and the SP value (SP(B)) of the polymer block composed of the structural units derived from the monomer B.

Ltd.) having a circulation path to prepare a dispersion containing emulsified particles (oil droplets).

—Polymerizable Monomer Composition (1)—

| | |
|---|---|
| Styrene | 245 parts by mass |
| n-Butyl acrylate | 120 parts by mass |
| n-Octyl-3-mecaptopropionate | 1.5 parts by mass |
| Polyethylene wax (melting point: 81° C.) | 43.2 parts by mass |
| Block copolymer [1] | 73.2 parts by mass |

Then a polymerisation initiator solution prepared by dissolving 6 parts by mass of potassium persulfate in 100 parts by mass of ion exchanged water was added to the obtained dispersion. The resultant dispersion was heated and stirred at a temperature of 82° C. for 1 hour to perform polymerization, and a dispersion of fine resin particles [1HM] was thereby obtained.

Then a polymerization initiator solution prepared by dissolving 11 parts by mass of potassium persulfate in 400 parts by mass of ion exchanged water was added, and a solution mixture prepared by mixing the following polymerizable monomer composition (2) was added dropwise at a temperature of 82° C. over 1 hour. The resultant mixture was heated and stirred for 2 hours to perform polymerization and cooled to 28° C. to thereby obtain a fine resin particle dispersion [1] containing the fine resin particles [1] dispersed therein. The SP value of the fine resin particles [1] was 10.2.

TABLE 1

| COPOLYMER NO. | STRUCTURE | MONOMER ALKYL METHACRYLATE A1 | MONOMER ALKYL ACRYLATE B | MONOMER ALKYL METHACRYLATE A2 | MASS RATIO A/B | Mw | MwA1/ MwA2 | TgA (° C.) | TgB (° C.) | SP (A) | SP (B) |
|---|---|---|---|---|---|---|---|---|---|---|---|
| 1 | A-B-A | MMA | BA | MMA | 5/5 | 80,000 | 1 | 105 | −55 | 10.0 | 9.8 |
| 2 | A-B-A | MMA | BA | MMA | 3/7 | 130,000 | 0.9 | 105 | −55 | 10.0 | 9.8 |
| 3 | A-B-A | MMA | BA | MMA | 1/9 | 100,000 | 1 | 105 | −55 | 10.0 | 9.8 |
| 4 | A-B-A | MMA | BA | MMA | 7/3 | 120,000 | 0.8 | 105 | −55 | 10.0 | 9.8 |
| 5 | A-B-A | EMA | BA | EMA | 3/7 | 130,000 | 1 | 50 | −55 | 9.7 | 9.8 |
| 6 | A-B-A | n-MBA | BA | n-MBA | 3/7 | 130,000 | 0.9 | 18 | −55 | 9.4 | 9.8 |
| 7 | A-B-A | MMA | EA | MMA | 3/7 | 130,000 | 1 | 105 | −20 | 10.0 | 10.2 |
| 8 | A-B-A | MMA | EHA | MMA | 3/7 | 130,000 | 0.9 | 105 | −70 | 10.0 | 9.2 |
| 9 | A-B | MMA | BA | — | 5/5 | 80,000 | — | 105 | −55 | 10.0 | 9.8 |
| 10 | A-B-A | STYRENE | BA | STYRENE | 3/7 | 100,000 | 1 | 80 | −55 | 10.5 | 9.8 |
| 11 | A | MMA | — | MMA | — | 80,000 | — | 105 | — | 10.0 | — |

* n-MBA: n-BUTYL METHACRYLATE
* EMA: ETHYL METHACRYLATE
* EA: ETHYL ACRYLATE
* EHA: 2-ETHYLHEXYL ACRYLATE

Toner Production Example 1

(1) Preparation of Fine Resin Particle Dispersion

A reaction vessel equipped with a stirrer, a temperature sensor, a condenser tube, and a nitrogen introduction tube was charged with 800 parts by mass of ion exchanged water and heated to 82° C. Then the reaction vessel was charged with a solution mixture prepared by mixing 17 parts by mass of sodium polyoxyethylene (2) dodecyl ether sulfate, 930 parts by mass of ion exchanged water, and the following polymerizable monomer composition (1), and the resultant mixture was mixed and dispersed, for 1 hour using a mechanical dispenser "CLEAMIX" (manufactured by M Technique Co., —Polymerizable Monomer Composition (2)—

| | |
|---|---|
| Styrene | 400 parts by mass |
| n-Butyl acrylate | 72 parts by mass |
| Methacrylic acid | 33 parts by mass |
| n-Octyl-3-mercaptopropionate | 12 parts by mass |

(2) Preparation of Fine Colorant Particles

Ninety parts by mass of sodium dodecylsulfate was added to 1,600 parts by mass of ion exchanged water, and 420 parts by mass of carbon black "REGAL 330R" (manufactured by Cabot Corporation) was gradually added to the prepared solution under stirring. Then the mixture was subjected to dispersion treatment using a stirring device "CLEARMIX" (manufactured by M Technique Co., Ltd.) to thereby prepare a fine colorant particle dispersion [1] containing the fine colorant particles dispersed therein. The diameter of the fine colorant particles in the fine colorant particle dispersion [1] was measured using an electrophoretic light-scattering photometer "ELS-800" (manufactured by Otsuka Electronics Co., Ltd.) and found to be 110 nm.

(3) Formation of Toner Particles:

A reaction vessel equipped with a stirrer, a temperature sensor, and a condenser tube was charged with 1,400 parts by mass of ion exchanged water, 300 parts by mass of the fine resin particle dispersion [1] (in terms of solid content), and 120 parts by mass of the fine colorant particle dispersion [1], and the temperature of the solution was adjusted to 30° C.

Then a 5 mol/L aqueous sodium hydroxide solution was added to the mixture to adjust the pH to 10, and an aqueous solution of 30° C. prepared by dissolving 35 parts by mass of magnesium chloride in 35 parts by mass of ion exchanged water was added, to the reaction system under stirring over 10 minutes. Three minutes after the addition, the temperature of the reaction system was increased to 86° C. over 60 minutes to allow aggregation to proceed. The size of the particles formed by aggregation was monitored using "Multisizer 3." When the volume-based median diameter (D50) reached 6.5 μm, 750 parts by mass of a 20% aqueous sodium chloride solution was added to terminate aggregation.

After the addition of the 20% aqueous sodium chloride solution, stirring was continued while the solution temperature was maintained at 81° C., and fusion, bonding of the aggregated particles was allowed to proceed while the average circularity of the particles was monitored using a flow-type particle image analyzer "FPIA-2100." After the average circularity was confirmed to be 0.940, the solution temperature was reduced to 30° C. Then hydrochloric acid was added, to adjust the pH to 4.0, and the stirring was stopped.

The obtained toner particles were subjected to solid-liquid separation using a basket-type centrifuge "MARKIII TYPE 60×40" (manufactured by Matsumoto Machine Manufacturing Co., Ltd.) to form a wet cake of the toner particles. The wet cake was washed with ion exchanged water of 40° C. in the basket-type centrifuge until the electric conductivity of the filtrate reached 5 μS/cm. Then the cake was transferred to a "flash jet dryer" (manufactured by Seishin Enterprise Co., Ltd.) and dried until the water content became 0.5% by mass to thereby obtain toner particles [1X], (4) Addition of External Additives:

One percent by mass of hydrophobic silica (number average primary particle diameter=12 nm) and 0.3% by mass of hydrophobic titania (number average primary particle diameter=20 nm) were added to the above-obtained toner particles [1X], and the mixture was mixed in a Henschel mixer to produce a toner [1].

The volume-based median diameter (D50) of the toner [1] was 6.5 μm, and its average circularity was 0.940.

Toner Production Examples 2 to 8

Fine resin particle dispersions [2] to [8] containing fine resin particles [2] to [8] dispersed therein, respectively, were obtained as in Toner Production Example 1 except that the block copolymers [2] to [8] were used instead of the block copolymer [1] in the fine resin particle dispersion preparing step, and toners [2] to [8] were obtained as in Toner Production Example 1 except that these fine resin particle dispersions [2] to [8] were used instead of the fine resin particle dispersion [1] in the toner particle forming step.

Toner Production Example 9

(1) Production of Polyester Resin

A flask equipped with a stirrer, a nitrogen introduction tube, a temperature sensor, and a rectifying column was charged with 370 parts by mass of terephthalic acid, 520 parts by mass of a 2 mole propylene oxide (PO) adduct of bispnenol A, and 110 parts by mass of a 2 mole ethylene oxide (EO) adduct of bispnenol A.

The mixture was heated to 190° C. over 1 hour. After the reaction system was confirmed to be uniformly mixed, a catalyst Ti(OBu)$_4$ (0.003% by mass based on the total mass of the polyvalent carboxylic acid monomer) was added. Then the temperature was increased from 190° C. to 240° C. over 6 hours while water generated was evaporated. A dehydration condensation reaction was further continued, at 240° C. for 6 hours to obtain a polyester resin [1].

(2) Preparation of Fine Resin Particle Dispersion

A reaction vessel equipped with a stirrer, a temperature sensor, and a condenser tube was charged with 1,500 parts by mass of ethyl acetate and heated to 75° C. Then 950 parts by mass of the polyester resin [1] and 50 parts by mass of the block copolymer [1] were added, and a solution prepared by dissolving 7 parts by mass of sodium polyoxyethylene (2) dodecyl ether sulfate in 3,000 parts by mass of ion exchanged water was added to the mixture. The resultant mixture was mixed, and dispersed for 1 hour using a mechanical dispenser "CLEAMIX" (manufactured by M Technique Co., Ltd.) having a circulation path to prepare a dispersion containing emulsified particles (oil droplets).

The dispersion was distilled under reduced pressure to prepare a fine resin particle dispersion [PEs] containing fine resin particles [PEs] dispersed therein. The SP value of the fine resin particles [PEs] was 11.2.

(3) Formation of Toner Particles and Addition of External Additives

Toner particles were obtained as in Toner Production Example 1 except that the fine resin particle dispersion [PEs] was used instead of the fine resin particle dispersion [1] in the toner particle forming step, and a toner [9] was obtained by adding external additives in a manner similar to that in the external additive adding step in Toner Production Example 1

Toner Production Examples 10 to 12

For Comparison Purposes

Fine resin particle dispersions [9] to [11] containing the fine resin particles [9] to [11] dispersed therein, respectively, were obtained as in Toner Production Example 1 except that the block copolymers [9] to [11] were used instead of the block copolymer [1] in the fine resin particle dispersion preparing step, and toners [10] to [12] were obtained as in Toner Production Example 1 except that these fine resin particle dispersions [9] to [11] were used instead of the fine resin particle dispersion [1] in the toner particle forming step.

Toner Production Example 13

For Comparison Purposes

A toner [13] was obtained as in Toner Production Example 1 except that the block copolymer [1] was not used.

Developer Production Examples 1 to 13

Developers [1] to [13] were prepared by mixing each of the toners [1] to [13] with a ferrite carrier coated with a silicone resin and having a volume average particle diameter of 50 μm such that the concentrations of the toners were 6%.

Evaluation 1: Low-Temperature Fixability

For each of the developers [1] to [13], a fixing experiment was performed using a copier "bizhub PRO C6500" (manufactured by Konica Minolta Business Technologies, Inc.) including a fixing unit modified such that the surface temperature of a heating roller (fixing temperature) could be changed within a range of 120 to 200° C. In the fixing experiment, a solid image (1.5 cm×1.5 cm) with a toner adhesion amount of 2 mg/cm² was fixed on an A4 high-quality paper sheet (basis weight: 64 g/m²) in a room temperature and room, humidity environment (temperature: 20° C., humidity: 55% RH), The fixing experiment was repeated while the fixing temperature setting was increased, from 120° C. to 200° C. by an increment of 5° C.

A printed sheet obtained in each of the fixing experiments at different fixing temperatures was folded using a folding machine with a load applied to the solid image. Compressed air at 0.35 MPa was blown onto the folded sheet, and the fold was ranked on a scale of 1 to 5 shown in the following evaluation criteria by referring to boundary samples. A temperature between, the fixing temperature in a fixing experiment in which rank 5 was first achieved and the fixing temperature in the preceding fixing experiment in which the evaluation result was rank 4 was used as a minimum fixing temperature. The results are shown in TABLE 2. A printed sheet having a minimum fixing temperature of 150° C. or lower was judged, as "pass."

—Evaluation Criteria—

Rank 5: No exfoliation occurred.
Rank 4: Exfoliation occurred along part of the fold.
Rank 3: Exfoliation occurred, along thin lines along the fold.
Rank 2: Exfoliation occurred along thick lines along the fold.
Rank 1: Exfoliation, occurred, to a large extent.

Evaluation 2: Post-Fixing Separability

For each of the developers [1] to [13], a solid black band-shaped image (toner adhesion amount: 4.5 mg/cm²) having a width of 5 cm and extending in a direction orthogonal to a sheet conveying direction was fixed on a longitudinally conveyed A4 high-quality paper sheet (basis weight: 64 g/m²) using a copier "bizhub PRO C6500" (manufactured by Konica Minolta Business Technologies, Inc.) including a fixing unit with the surface temperature of a heating roller being set to 195° C. The separability of the paper sheet was evaluated according to the following evaluation criteria. The results are shown in TABLE 2.

"A," "B," and "C" are pass grades.

—Evaluation Criteria—

A: The paper sheet was not curled and was separated from the heating roller without contact with a separation claw.

B: The paper sheet was separated from the heating roller by the separation claw, but no marks by the separation claw were formed on the image, C: The paper sheet was separated from the heating roller by the separation claw, and marks on the image by the separation claw were almost unnoticeable.

D: The paper sheet was separated from the heating roller by the separation claw, and marks by the separation claw were formed on the image, or the paper sheet was wound around the heating roller and could not be separated from the heating roller.

TABLE 2

| | | | EVALUATION RESULTS | |
| --- | --- | --- | --- | --- |
| | TONER NO. | COPOLYMER NO. | MINIMUM FIXING TEMPERATURE (° C.) | POST-FIXING SEPARABILITY |
| EXAMPLE 1 | 1 | 1 | 150 | A |
| EXAMPLE 2 | 2 | 2 | 150 | A |
| EXAMPLE 3 | 3 | 3 | 150 | B |
| EXAMPLE 4 | 4 | 4 | 160 | A |
| EXAMPLE 5 | 5 | 5 | 150 | C |
| EXAMPLE 6 | 6 | 6 | 145 | C |
| EXAMPLE 7 | 7 | 7 | 160 | B |
| EXAMPLE 8 | 8 | 8 | 145 | C |
| EXAMPLE 9 | 9 | 1 | 135 | A |
| COMPARATIVE EXAMPLE 1 | 10 | 9 | 170 | C |
| COMPARATIVE EXAMPLE 2 | 11 | 10 | 165 | C |
| COMPARATIVE EXAMPLE 3 | 12 | 11 | 175 | A |
| COMPARATIVE EXAMPLE 4 | 13 | — | 160 | C |

The invention claimed is:

1. A toner for electrostatic image development, the toner comprising:
   toner particles containing a binder resin, wherein
   the binder resin contains a block copolymer having an A-S-A block copolymer structure including polymer blocks A composed of a structural unit derived from an alkyl methacrylate and a polymer block B composed of a structural unit derived from an alkyl acrylate,
   a glass transition point (TgA) of a homopolymer of the alkyl methacrylate forming the polymer blocks A is higher than a glass transition point (TgB) of a homopolymer of the alkyl acrylate forming the polymer block, B,
   the binder resin further contains a main resin other than the block copolymer, and
   a difference between an SP value of the homopolymer of the alkyl methacrylate forming the polymer blocks A and an SP value of the main resin is 0.1 or larger.

2. The toner for electrostatic image development according to claim 1, wherein a mass ratio of the polymer blocks A to the polymer block B in the block copolymer is within a range of 5/5 to 1/9.

3. A toner for electrostatic image development according to claim 2, wherein the mass ratio of the polymer blocks A to the polymer block B in the block copolymer is within a range of 5/5 to 3/7.

4. The toner for electrostatic image development according to claim 1, wherein a content of the block copolymer in the toner particles is 1 to 20 parts by mass per 100 parts by mass of the binder resin.

5. The toner for electrostatic image development according to claim 4, wherein the content of the block copolymer in the toner particles is 5 to 10 parts by mass per 100 parts by mass of the binder resin.

6. The toner for electrostatic image development according to claim 1, wherein a weight-average molecular weight (Mw) of the block copolymer is 20,000 to 160,000.

7. The toner for electrostatic image development according to claim 6, wherein the weight-average molecular weight (MW) of the block copolymer is 60,000 to 80,000.

8. The toner for electrostatic image development according to claim 1, wherein the alkyl methacrylate forming the polymer blocks A has an alkyl chain having not more than 4 carbon atoms.

9. The toner for electrostatic image development according to claim 1, wherein the alkyl acrylate forming the polymer block B has an alkyl chain having not more than 8 carbon atoms.

10. The toner for electrostatic image development according to claim 9, wherein the alkyl acrylate forming the polymer block B has an alkyl chain having 2 to 7 carbon atoms.

11. The toner for electrostatic image development according to claim 10, wherein the alkyl acrylate forming the polymer block B has an alkyl chain having 4 carbon atoms.

12. The toner for electrostatic image development according to claim 1, wherein a difference between the glass transition point (TgA) of the homopolymer of the alkyl methacrylate forming the polymer blocks A and the glass transition point (TgB) of the homopolymer of the alkyl acrylate forming the polymer block B is 10° C. or larger.

13. The toner for electrostatic image development according to claim 12, wherein the difference between the glass transition point (TgA) of the homopolymer of the alkyl methacrylate forming the polymer blocks A and the glass transition point (TgB) of the homopolymer of the alkyl acrylate forming the polymer block B is 100° C. to 180° C.

14. The toner for electrostatic image development according to claim 1, wherein the binder resin further contains any of a styrene-acrylic resin and a polyester resin.

15. The toner for electrostatic image development according to claim 1, wherein a difference between an SP value of the homopolymer of the alkyl methacrylate forming the polymer blocks A and an SP value of the homopolymer of the alkyl acrylate forming the polymer block B is 0.1 or larger.

16. The toner for electrostatic image development according to claim 1, wherein the difference between the SP value of the homopolymer of the alkyl methacrylate forming the polymer blocks A and the SP value of the main resin is 0.3 to 2.

17. A toner for electrostatic image development, the toner comprising:
toner particles containing a binder resin, wherein
the binder resin contains a block copolymer having an A-B-A block copolymer structure including polymer blocks A composed of a structural unit derived from an alkyl methacrylate and a polymer block B composed of a structural unit derived from an alkyl acrylate,
a glass transition point (TgA) of a homopolymer of the alkyl methacrylate forming the polymer blocks A is higher than a glass transition point (TgB) of a homopolymer of the alkyl acrylate forming the polymer bloc, B,
the binder resin further contains a main resin other than the block copolymer, and
a difference between an SP value of the homopolymer of the alkyl methacrylate forming the polymer blocks A and an SP value of the main resin is 0.1 or larger, forming the polymer block B, and
a content of the block copolymer in the toner Particles is 1 to 20 parts by mass per 100 parts by mass of the binder resin.

18. A toner for electrostatic image development, the toner comprising:
toner particles containing a binder resin, wherein
the binder resin contains a block copolymer having an A-B-A block copolymer structure including polymer blocks A composed of a structural unit derived from an alkyl methacrylate and a polymer block B composed of a structural unit derived from an alkyl acrylate,
a glass transition point (TgA) of a homopolymer of the alkyl methacrylate forming the polymer blocks A is higher than a glass transition point (TgB) of a homopolymer of the alkyl acrylate forming the polymer block B, and
the binder resin further contains any of a styrene-acrylic resin and a polyester resin.

* * * * *